United States Patent
Zhu et al.

(10) Patent No.: US 11,971,864 B2
(45) Date of Patent: Apr. 30, 2024

(54) ONLINE MERGING OF FRAGMENTED COMPUTING RESOURCES ACROSS STORAGE SERVERS BY TENANT IN CLOUD ENVIRONMENTS

(71) Applicant: Oracle International Corporation, Redwood Shores, CA (US)

(72) Inventors: Shushuai Zhu, Nashua, NH (US); Bo Zou, Ottawa (CA); Yueying Yang, San Jose, CA (US); Nagarajan Muthupandian, Thane (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/936,143

(22) Filed: Sep. 28, 2022

(65) Prior Publication Data
US 2024/0004844 A1 Jan. 4, 2024

Related U.S. Application Data

(60) Provisional application No. 63/367,430, filed on Jun. 30, 2022.

(51) Int. Cl.
*G06F 16/21* (2019.01)
*G06F 16/17* (2019.01)
(Continued)

(52) U.S. Cl.
CPC .......... *G06F 16/21* (2019.01); *G06F 16/1724* (2019.01); *G06F 16/2379* (2019.01); *G06F 16/256* (2019.01)

(58) Field of Classification Search
CPC .. G06F 16/21; G06F 16/1724; G06F 16/2379; G06F 16/256
See application file for complete search history.

(56) References Cited

U.S. PATENT DOCUMENTS 5,583,995 A * 12/1996 Gardner ............. H04N 7/17318
348/E7.071
8,578,123 B2 * 11/2013 Lee ........................ G06F 3/064
711/170

(Continued)

OTHER PUBLICATIONS

Ng et al., DeFrag: Defragmentation for Efficient Runtime Resource Allocation in NoC-based Many-core Systems, 2015 23rd Euromicro International Conference on Parallel, Distributed, and Network-Based Processing, pp. 345-352. (Year: 2015).*

*Primary Examiner* — Cheyne D Ly
(74) *Attorney, Agent, or Firm* — Mughal Gaudry & Franklin PC

(57) ABSTRACT

Client data corresponding to a single client can be stored. A decision to proceed with a defragmentation of two or more particular core groups can be determined. A destination core group to receive client data can be identified. At least one additional core group can be initiated to manage interim data write requests from the single client. Each of the two or more particular core groups can be closed to data write requests. A defragmentation of the two or more particular core groups can be performed by merging into the destination core group. The destination core group can be availed to data read and delete requests. The two or more fragmented core groups can be reallocated for other uses. The additional core groups continue to receive read and write requests. The destination core groups further can be merged and defragmented further.

20 Claims, 11 Drawing Sheets

(51) Int. Cl.
    *G06F 16/23*     (2019.01)
    *G06F 16/25*     (2019.01)

(56) References Cited

U.S. PATENT DOCUMENTS

| | | | |
|---|---|---|---|
| 2013/0185264 A1* | 7/2013 | Cohen | G06F 11/2069 |
| | | | 707/655 |
| 2021/0248109 A1* | 8/2021 | Teng | G06F 16/1724 |
| 2023/0108949 A1* | 4/2023 | Moore | G06F 16/1734 |
| | | | 707/693 |
| 2023/0236966 A1* | 7/2023 | Yarimi | G06F 3/0659 |
| | | | 711/170 |

* cited by examiner

ONLINE MERGING OF FRAGMENTED COMPUTING RESOURCES ACROSS STORAGE SERVERS BY TENANT IN CLOUD ENVIRONMENTS

CROSS REFERENCE TO RELATED APPLICATION

This claims priority to U.S. Ser. No. 63/367,430 titled "Online Merging of Fragmented Computing Resources Across Storage Servers by Tenant in Cloud Environments" and filed Jun. 30, 2022, the entirety of which is incorporated herein by reference.

TECHNICAL FIELD

The present disclosure relates generally to computer data storage and, more particularly (although not necessarily exclusively), to allocation and defragmentation of cloud storage resources.

BACKGROUND

Computing systems typically have a finite set of resources at any given point in time. A given computing system may be used to support computational operations and/or data storage of multiple clients. Thus, a computing system frequently must determine how to allocate the resources across clients. Determining how to allocate resources is challenging, as different clients frequently use the computing system to perform different types of operations and/or uses, and there is frequently sizable variability across clients with respect to the amount of data that is being fed to the computing system.

It would be advantageous to develop a resource-allocation strategy that can efficiently utilize resources of the computing system.

SUMMARY

Techniques are provided (e.g., a method, a system, non-transitory computer-readable medium storing code or instructions executable by one or more processors) for online merging of fragmented computer resources across storage servers in cloud environments. Various embodiments are described herein, including methods, systems, non-transitory computer-readable storage media storing programs, code, or instructions executable by one or more processors, and the like.

One embodiment is directed to a computer-implemented method that includes storing client data corresponding to a single client across a plurality of core groups, wherein each of the plurality of core groups includes one or more cores associated with a group coordinator to manage cores in the core group, in a particular iteration of a plurality of iterations of defragmentation consideration, determining to proceed with a defragmentation of two or more particular core groups in the plurality of core groups, identifying a destination core group of the plurality of core groups to receive client data from each other of the two or more particular core groups, initiating at least one additional core group to manage interim data write requests from the specific client during a merge of the two or more particular core groups, closing each of the two more particular core groups to data write requests, performing a defragmentation of the two or more particular core groups by merging the two or more particular core groups into the destination core group, wherein the at least one additional core group includes data from write requests that prior to defragmentation would have been written to the two or more particular core groups, and availing the destination core group to data read requests, wherein subsequent to defragmentation the destination core group receives read requests for data that would have been received by one of the two or more particular core groups prior to defragmentation.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

BRIEF DESCRIPTION OF THE DRAWINGS

The present disclosure is described in conjunction with the appended figures.

Figure 1:
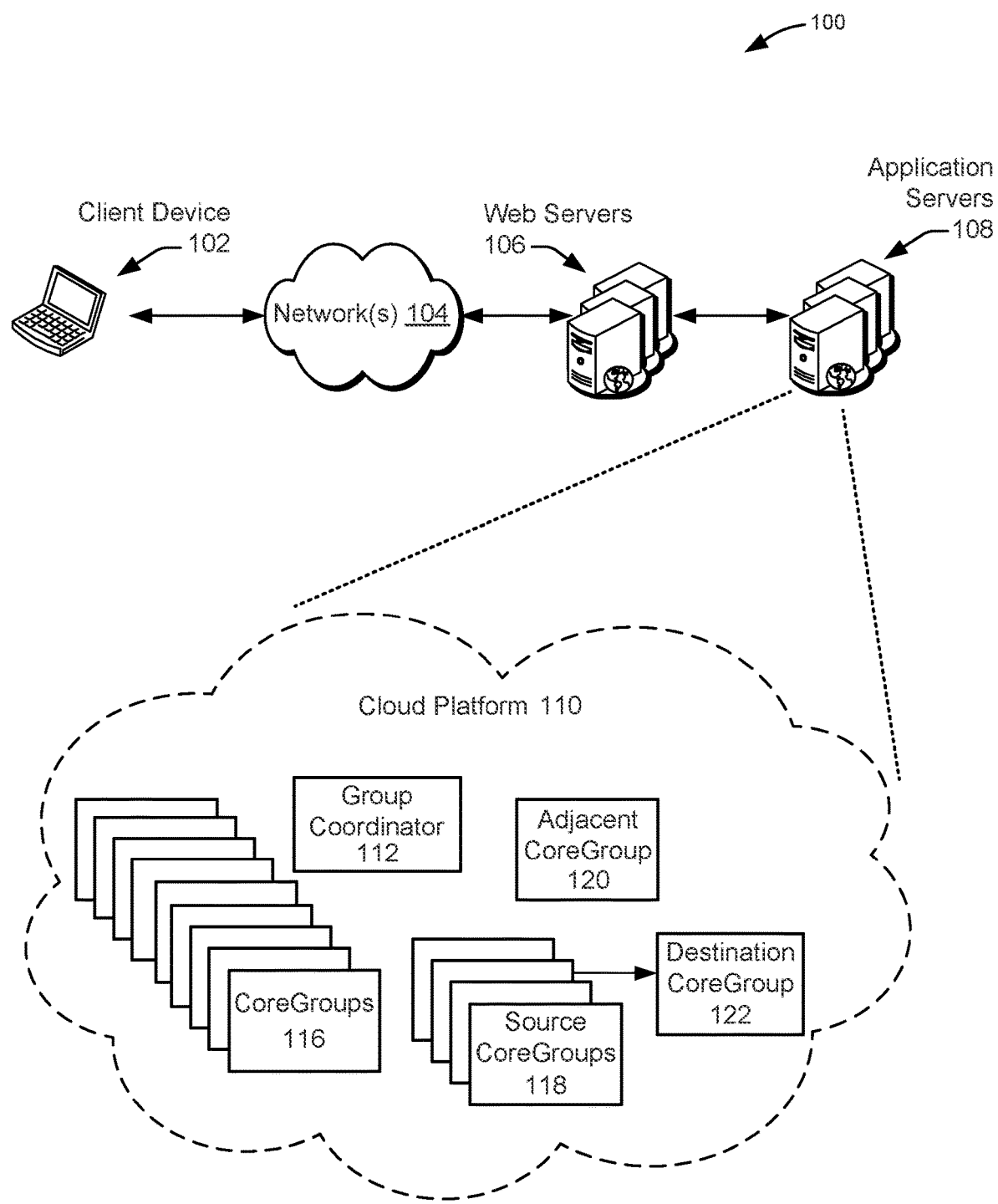
FIG. 1 depicts an illustrative system in which embodiments of the disclosure may be implemented in accordance with various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to systems and techniques for storing client data associated with a given client across a plurality of core groups and for implementing a defragmentation process on particular core groups when certain criteria are met. As used herein, a "core group" refers to a group of multiple cores associated with a given client (e.g., each core group associated with a given client) and may potentially include a group coordinator to manage cores within the group. As used herein, a "core" refers to a single physical index that potentially corresponds to a given client. Each core includes files (e.g., configuration and schema files) associated with a client and potentially a transaction log. As used herein, a "node" refers to a computational resource, such as a Solr instance (or Java Virtual Machine). Each node can host multiple cores. Thus, a single node may be able to support multiple configurations and schema. As used herein, a "node set" refers to a set of nodes that are managed as a unit, and one node set can contain multiple core groups. A solr server (machine or host) can contain multiple node sets.

A storage server can include heterogeneous hardware resources (e.g., central processing units (CPUs), memory, disk, network, PC (personal computer) servers, UNIX® servers, mid-range servers, mainframe computers, rack-mounter servers, etc.). The hardware resources may be allocated to clients to serve client data loading, storage, and data retrieving/analyzing across thousands of storage servers in cloud environments. The storage server can hold running Solr instances (like database instances), in which client data (raw or enriched) can be ingested. As the client data is ingested, the client data can also be analyzed or queried by users. The hardware resources can be allocated in a manner such that a single hardware resource encompasses each core group associated with a single client. For example, all of the cores for a core group can be contained within a single mainframe computer. Queries made by the client that include the core group can be more efficient due to simplified hardware resource allocation and parallel execution across multiple instances.

As an example, a core group can act as a single "building block" or "resource bucket" of a storage server that includes maximum capacities of 64 CPUs, 512 GB of memory, 16 TB of block volume, or 40 gbps of network bandwidth. Then, the maximum allowed number of "resource buckets" can be set at a value of 50, for example. This means each core group would represent 1/50 of computing resources of the server. Each core group can correspond to a group of solr cores in multiple running solr instances on the storage server. Every core group can have data ingested, queried, deleted, or some combination thereof, at different times or concurrently.

Over time, data deletion by clients can fragment core groups. Since the total number of core groups can be limited to a fixed set of hardware, computing resources can be limited due to the fragmented core groups. Further, the fragmentation can result in more expensive querying or analyzing performance for clients due to an increased number of core groups in results aggregation for a specified time range. When merging fragmented core groups into a larger destination core group, steps can be performed to ensure a merging process is online without an interruption to data processing and data queries by clients.

FIG. 1 depicts an illustrative system in which embodiments of the disclosure may be implemented in accordance with various embodiments. As will be appreciated, although a web-based environment is used for purposes of explanation, different environments may be used, as appropriate, to implement various embodiments of the illustrative system. FIG. 1 depicts an illustrative system 100 that includes at least one client device 102, which can include any appropriate device operable to send and receive requests, messages or information over an appropriate network 104 and convey information back to a user of the device 102. Examples of such client devices include personal computers, cell phones, handheld messaging devices, laptop computers, set-top boxes, personal data assistants, electronic book readers, and the like. The network 104 can include any appropriate network, including an intranet, the Internet, a cellular network, a local area network, or any other such network or combination thereof. Components used for such a system can depend at least in part upon the type of network and/or environment selected. Protocols and components for communicating via such a network may be known to one skilled in the art and will not be discussed herein in detail. Communication over the network can be enabled by wired or wireless connections and combinations thereof. In this example, the network includes the Internet, as the illustrative system includes a Web server 106 for receiving requests and serving content in response thereto, although for other networks an alternate device serving a similar purpose could be used as would be apparent to one of ordinary skill in the art.

The illustrative system 100 includes at least one application server 108. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server 108 can include any appropriate hardware and software for integrating with the data store as needed to execute aspects of one or more applications for the client device, handling a majority of the data access and business logic for an application. The application server 108 provides access control services in cooperation with the data store and is able to generate content such as text, graphics, audio and/or video to be transferred to the user, which may be served to the user by the Web server 106 in the form of HyperText Markup Language ("HTML"), Extensible Markup Language ("XML"), or other appropriate structured language in this example. The handling of all requests and responses, as well as the delivery of content between the client device 102 and the application server 108, can be handled by the Web servers 106. It should be understood that the Web server 106 and the application server 108 are not required and are merely example components, as structured code discussed herein can be executed on any appropriate device or host machine as discussed elsewhere herein.

Each server typically will include an operating system that provides executable program instructions for the general admission and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The illustrative system 100 includes an environment in one embodiment that is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of system 100 in FIG. 1 should be taken as being illustrative in nature and not limiting to the scope of the disclosure.

The application servers 108 may implement a cloud platform 110. The cloud platform may implement at least one group coordinator 112. In some embodiments, the cloud platform may implement a number of cloud server instances operating on behalf of one or more clients. Additionally, within the cloud platform 110, the at least one group coordinator 112 may manage cores associated with a plurality of core groups 116, which can include two or more particular core groups 118 that can be referred to as source core groups 118, at least one adjacent core group 120, and at least one destination core group 122. In some embodiments, a infrastructure system may merge the two or more particular core groups into the at least one destination core group 122 with assistance from the at least one adjacent core group 120.

Figure 2:
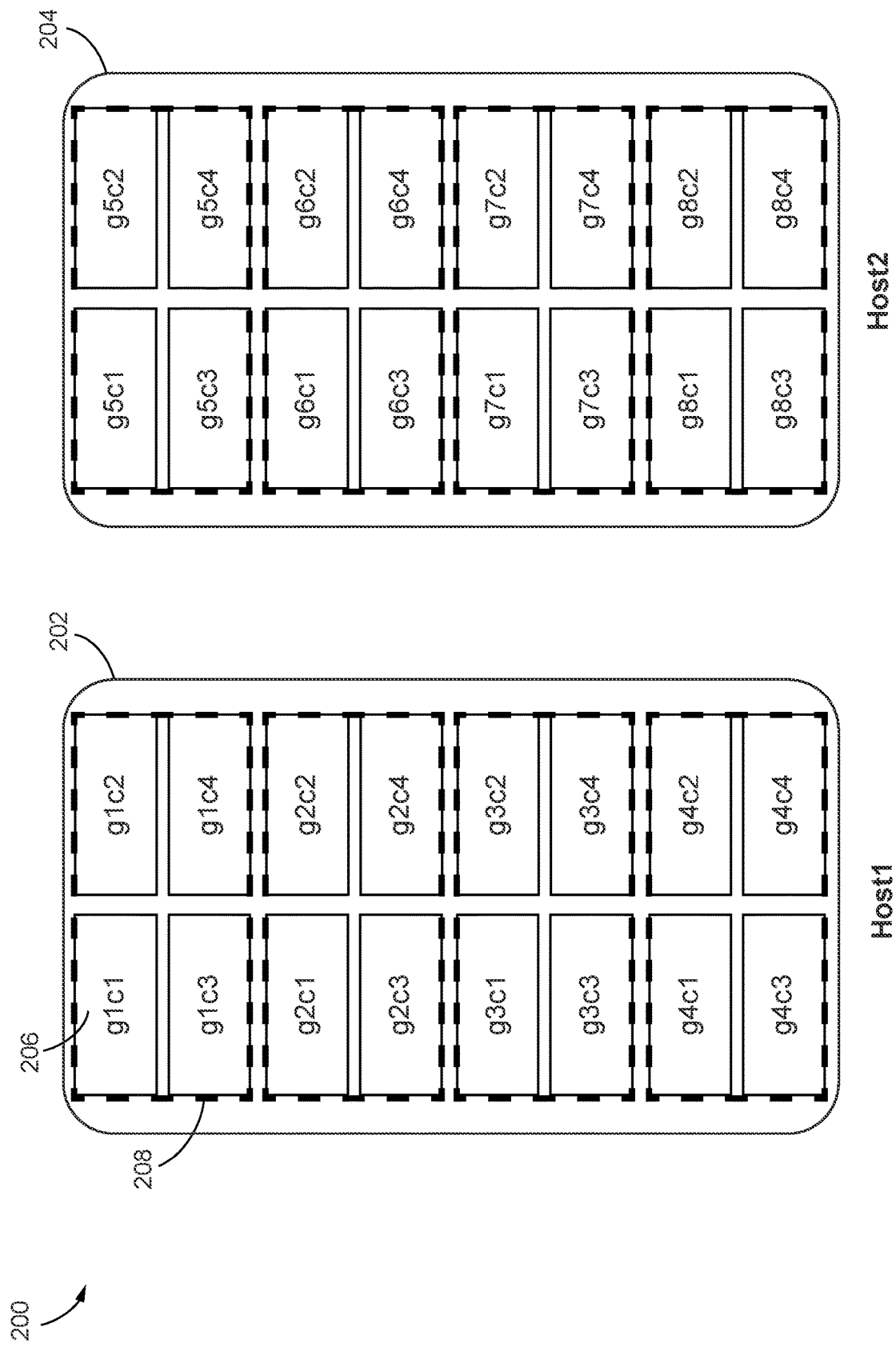
FIG. 2 depicts a diagram illustrating an example of allocation of hardware resources such that each core group is included in a single hardware resource in accordance with at least some embodiments.

FIG. 2 depicts a diagram 200 illustrating an example of allocation of hardware resources such that each core group is included in a single hardware resource in accordance with at least some embodiments. The diagram 200 includes two hardware resources (host1 202 and host2 204), several core groups 206, and several cores 208. Although two hardware resources are depicted in FIG. 2, other examples can include more or fewer than two hardware resources. Hardware resource host1 202 includes four core groups 206, but only one core group 206 is labeled. Each core group 206 in host1 202 includes four cores 208 but only one core group is labeled. Similarly, hardware resource host2 204 includes four core groups 206, each having four cores 208. The hardware resources host1 202 and host2 204 can be of the same or different type of hardware resource. Each of the core groups 206 can be identical to the other core groups in terms of a memory capacity allotted to each of the core groups 206. Each of the core groups 206 can receive data from a single client, but different core groups 206 can receive data from different clients. Data can be stored to a particular core group based on the particular core group having an affinity for that data. For example, the particular core group can have an affinity for data associated with a particular geological region such as from states along the east coast. The affinity can also comprise a time range.

In some examples, each core group 206 can include two client timestamp values associated with the client data included in the core group 206. One client timestamp is associated with an initial time associated with the data and the other is associated with a later time associated with the data. For example, the client can associate data with transactions during a particular business week. The initial client timestamp can refer to a beginning of the business week and the later client timestamp can be associated with an end of the business week. In some examples, the later client timestamp for a certain core group 206 associated with a client can be associated with a time that the core group 206 reaches capacity. In such examples, another core group 206 for the same client will receive subsequent data from the same client and will include an initial client timestamp that coincides with the later client timestamp for the certain core group. This can occur when there is a pause in a data stream from the client after the certain core group reaches capacity.

In certain examples, clients can choose to store historic data in a core groups 206. The core groups 206, in such examples, will include initial client timestamps with values that are less than the client timestamp associated with the present time. In another example, a first core group 206 can reach capacity prior to a pause in a data stream that includes data associated with two client timestamps from a client. A second core group 206 can receive the additional data from the client. In this example, the second core group 206 can include the same two client timestamps as the first core group 206 since the client data that the second core group 206 receives is associated with the two client data times. In this case, the first core group 206 and the second core group 206 can each be assigned two server timestamps. The server timestamp values can be associated with initial and final times for data received by each core group 206 for the data stream.

Figure 3:
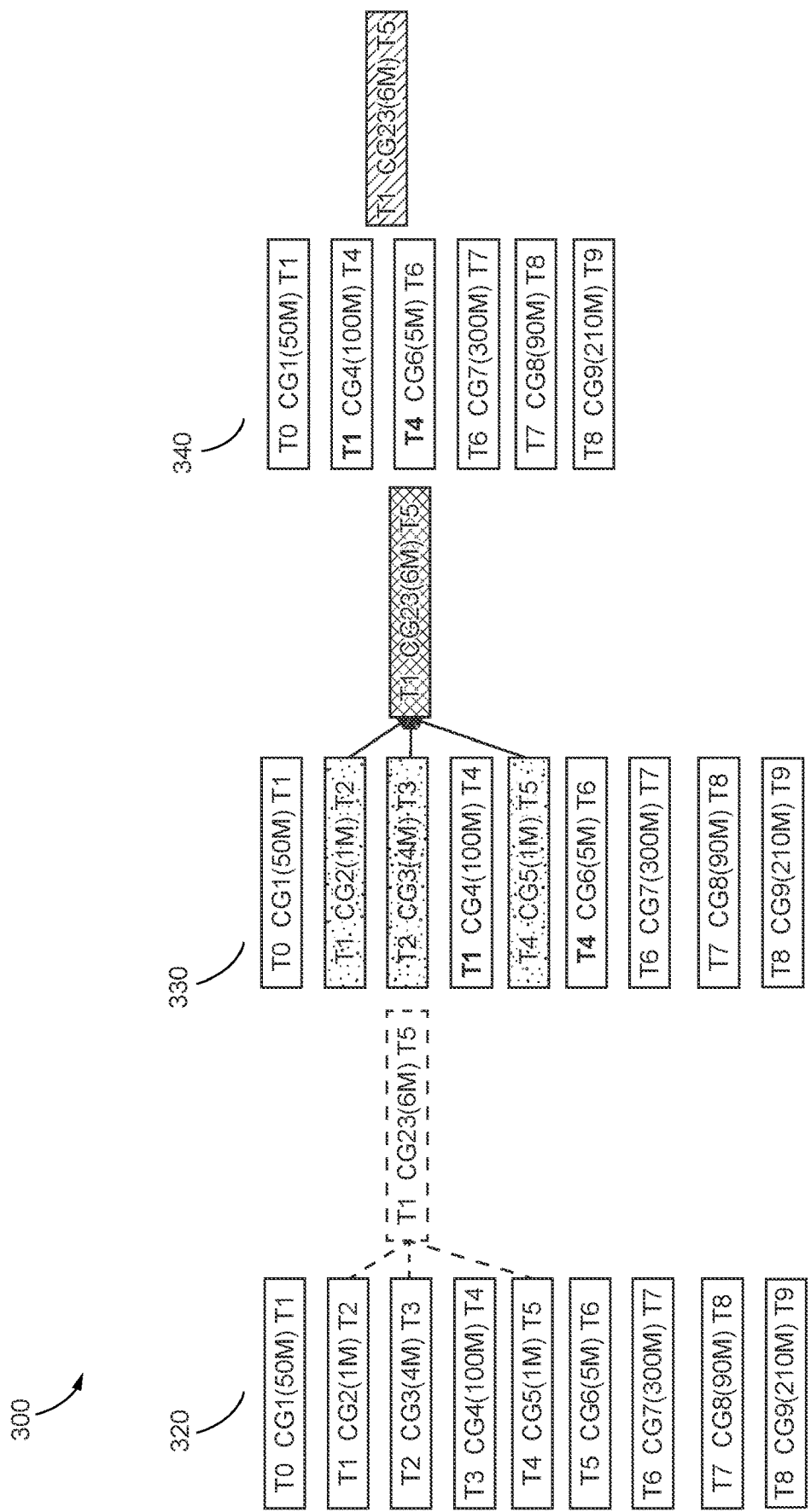
FIG. 3 depicts a diagram illustrating an example of defragmentation of two or more particular core groups in accordance with at least some embodiments.

FIG. 3 depicts a diagram 300 illustrating an example of defragmentation of two or more particular core groups in accordance with at least some embodiments. The diagram includes three separate schematics 320, 330, and 340. Schematic 320 depicts a set of core groups prior to a defragmentation process. Schematic 330 depicts the set of core groups during the defragmentation process. Schematic 340 depicts the set of core groups after the defragmentation process.

Each of the schematics, 320, 330, and 340, include a set of core groups for a specific client. For example, schematic 320 shows ten core groups. Each core group is referenced in FIG. 3 with a label, a client data size and two timestamps. For example, the core group at the top of schematic 320 has a label core group 1 ("CG1"), the client data size of 50 M (in arbitrary units), an initial timestamp (T0), and a later timestamp (T1). The core group on the right side of schematic 320 is a destination core group and has a label CG23, client data size of 6 M, initial timestamp T1, and later timestamp T5. CG4 and CG6 are selected as core groups that will receive data for fragmented core groups during the defragmentation process. The client data size of 6 M for CG23 represents the client data size after defragmentation.

In some examples, a condition for performing defragmentation of a core group can be determined. In some examples, the condition can be satisfied when the client data size of at least two core groups is below a predefined threshold. For example, the predefined threshold for the client data size can be 5 M. There are three particular core groups in schematic 320 that are below the predefined threshold of 5 M: CG2 (client data size of 1 M), CG3 (4 M), and CG5 (1 M). Thus, CG2, CG3, and CG5 are fragmented core groups that meet the condition for defragmentation, can be referred to as 'source core groups', and are selected to be merged into destination core group CG23. The initial timestamp for CG23 (T1) matches the minimum value of the initial timestamps for the three source core groups. Additionally, the later time stamp for CG23 (T5) matches the maximum value of the later time stamps for the three source core groups.

Schematic 330 depicts the set of core groups during the defragmentation process. During the defragmentation process, the source core groups CG2, CG3, and CG5 will be read only and the destination core group CG23 will be closed to both read and write. At least one additional core group can be initiated to manage interim data write requests from the specific client during merging of the particular core groups, which are CG2, CG3, and CG5. In some examples, the at least one additional core group can be adjacent to the particular core groups. In this example, CG4 and CG6 are initiated at the additional core groups to manage interim data write requests during merging. The time stamps of the additional core groups are altered in order to manage the interim data write requests. For example, the initial timestamp of CG4 is changed from T3 to T1, the minimum initial timestamp of the particular core groups. The initial timestamp of CG6 in this example, is changed from T5 to T4, the maximum initial timestamp of the particular core groups. The three particular core groups CG2, CG3, and CG5 are merged into CG23 during the defragmentation process. Once merged the fragmented core groups CG2, CG3, and CG5 will be deleted and their corresponding computing resources will be recycled and reallocated to receive data for the specific client or for a different client.

Schematic 340 depicts the set of core groups after the defragmentation process. The fragmented core groups CG2, CG3, and CG5 are no longer present since CG2, CG3, and CG5 can be reallocated for other uses. The additional core groups CG4 and CG6 continue to receive read and write requests. Subsequent to defragmentation, the destination core group CG23 is availed to read requests. Data cannot be written to CG23, only read or deleted. There is overlap between CG23 and the additional core groups CG4, CG6.

Figure 4:
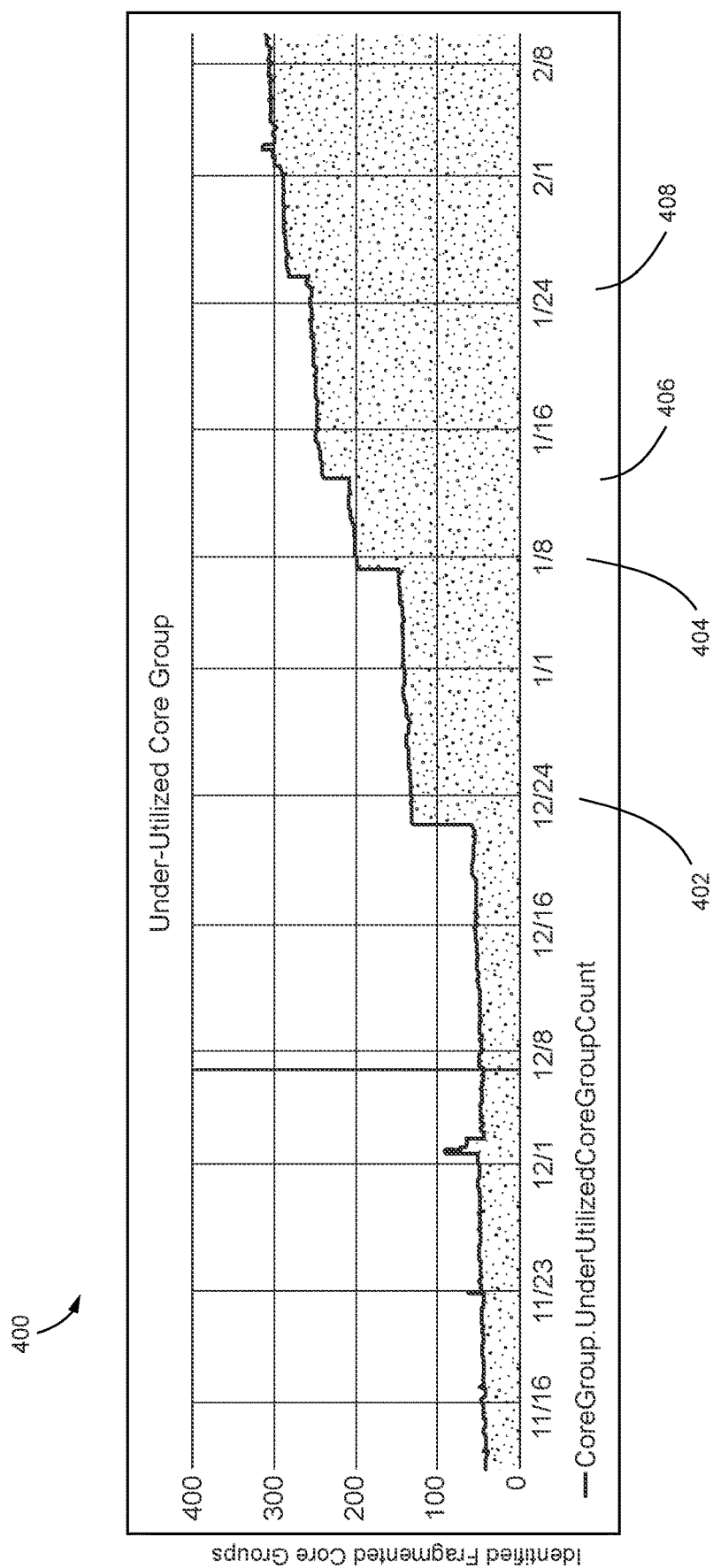
FIG. 4 is a graph that displays the number of fragmented core groups identified for a specific client over a period of time in accordance with embodiments.

FIG. 4 is a graph 400 that displays the number of fragmented core groups identified for a specific client over a period of time in accordance with embodiments. The abscissa of the graph 400 shows calendar dates during a twelve week period and the ordinate of the graph 400 displays numbers of identified fragmented core groups for the specific client. In this example, a core group is identified as fragmented when a client data size for the core group is below a predetermined threshold of 10% of a data capacity for the core group. Client data size can fall beneath that predetermined threshold over time due to client deletion of client data. The graph 400 shows that over the twelve week period, the number of identified fragmented core groups for this client exceeded 300. The graph 400 also shows that on certain dates 402, 404, 406, 408 the client deleted large amounts of data indicated by a sharp increase in the number of fragmented core groups on those dates.

Figure 5:
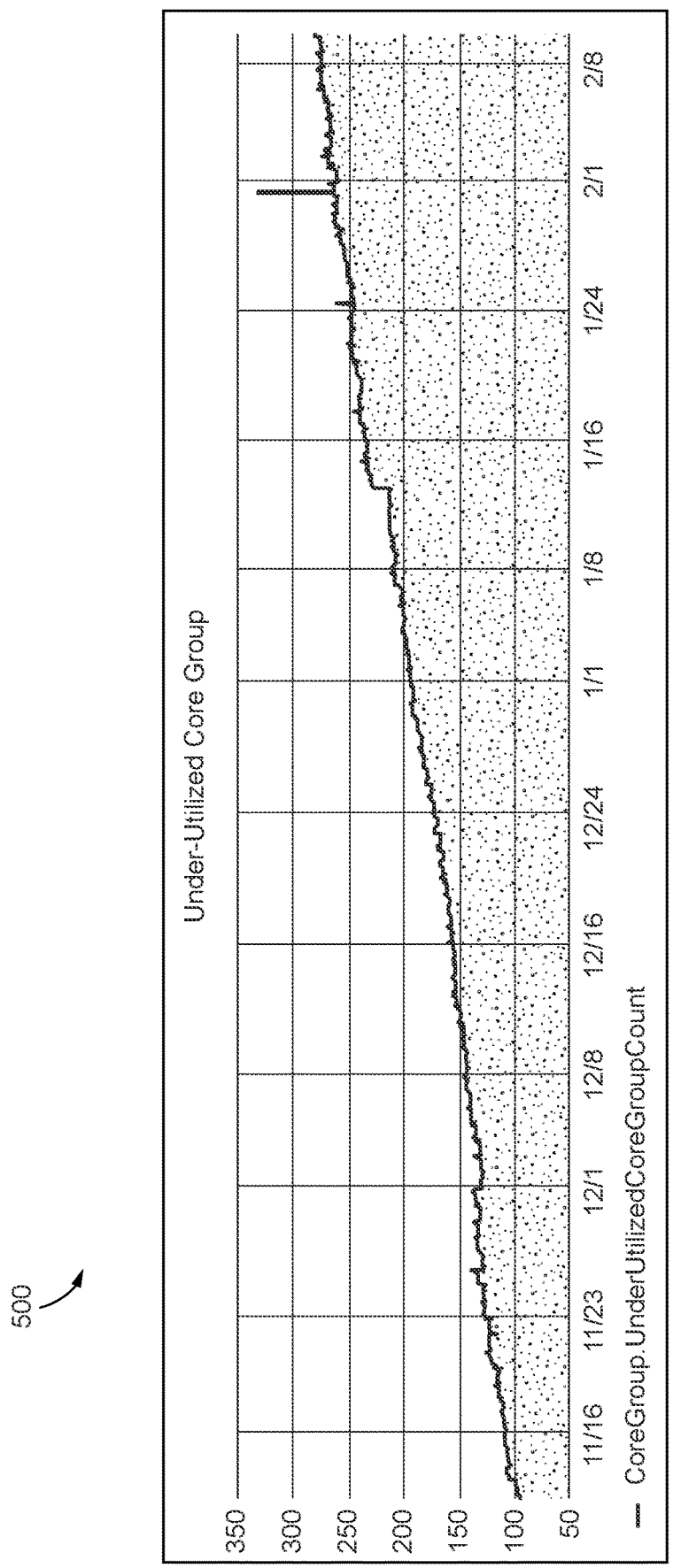
FIG. 5 is another graph that displays the number of fragmented core groups identified for a specific client over a period of time in accordance with embodiments.

FIG. 5 is another graph 500 that displays the number of fragmented core groups identified for a specific client over a period of time in accordance with embodiments. The specific client associated with data depicted in the graph 500 can be a different specific client than the specific client associated with data depicted in the graph 400 from FIG. 4. The abscissa of the graph 500 shows calendar dates during a twelve week period and the ordinate of the graph 500 displays numbers of identified fragmented core groups for the specific client. In this example, a core group is identified as fragmented when a client data size for the core group is below a predetermined threshold of 10% of a data capacity for the core group. The graph 500 shows that over the twelve week period, the number of identified fragmented core groups for this client gradually exceeded 250.

Figure 6:
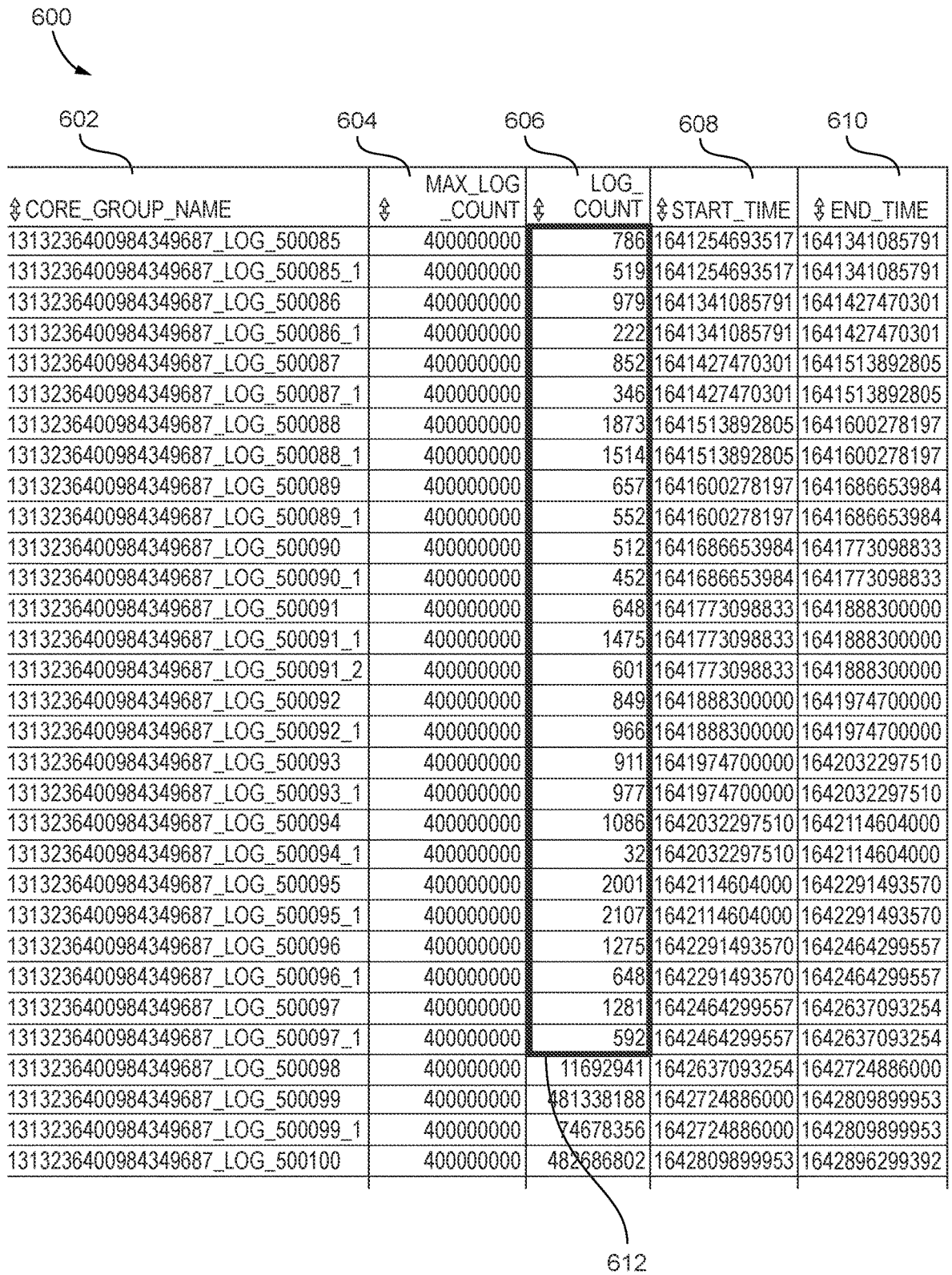
FIG. 6 depicts a table displaying a determination of fragmented core groups at a certain time in accordance with embodiments.

FIG. 6 depicts a table 600 displaying a determination of fragmented core groups at a certain time in accordance with embodiments. The table 600 includes five columns 602, 604, 606, 608, and 610. The first column 602 includes names of core groups. The second column 604 includes a capacity in arbitrary units for client data for each of the core groups. In this case, the capacity of each of the core groups has a value of 400 million or 400 M. The third column 606 shows the client data size for each core group. The fourth column 608 shows a value for an initial timestamp or start timestamp for each core group. The fifth column 610 shows a value for a later timestamp or end timestamp for each core group.

As an example, a core group can be identified as fragmented when a client data size for the core group is below a predetermined threshold of 2% of a data capacity for the core group. All of the values for client data size shown in box 612 are below this threshold. Thus, all of the core groups associated with those values are identified as fragmented. In this example, twenty-seven out of thirty-one core groups depicted in table 600 are identified as fragmented core groups.

Figure 7:
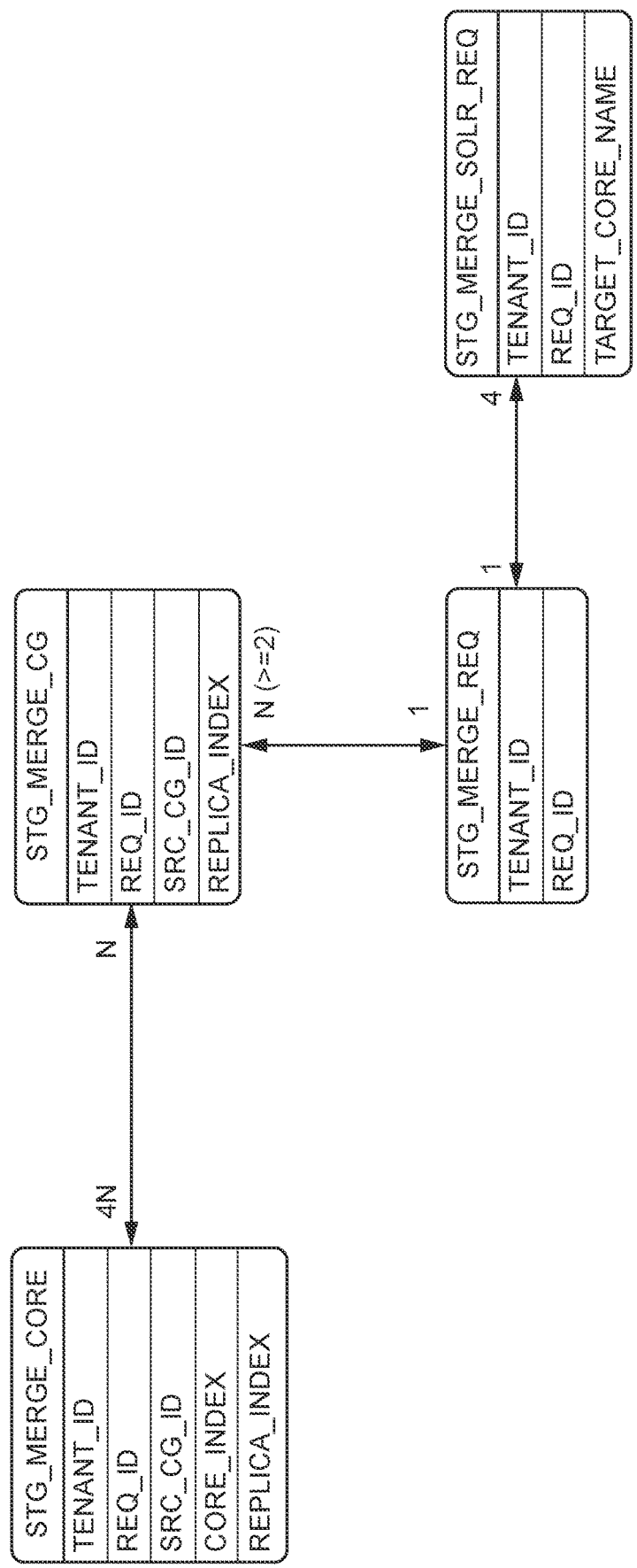
FIG. 7 depicts a schematic illustrating the merging process flow during defragmentation.

FIG. 7 depicts a schematic illustrating the merging process flow during defragmentation. Each rectangle illustrates a database table storing metadata for merging processing, with a header as a table name and items as table columns. The STG MERGE REQ table contains merge requests for multiple tenants, with each having a request ID. The STG MERGE CG table contains source core groups to be merged for multiple tenants, and the source core groups can be identified via IDs. The STG MERGE CORE table contains source cores to be merged for multiple tenants. The STG MERGE SOLR REQ table contains a destination core group for each merge request. The STG MERGE SOLR REQ is also used to track the status of merging processes running on remote servers. Numbers at ends of each double arrow line connecting tables show a relationship between the tables. For example, an arrow connecting the STG MERGE REQ and the STG MERGE CC table includes a '1' pointing to the STG MERGE REQ and N (>=2) pointing to the STG MERGE CG, which means that one merge request should contain at least two core groups.

Figure 8:
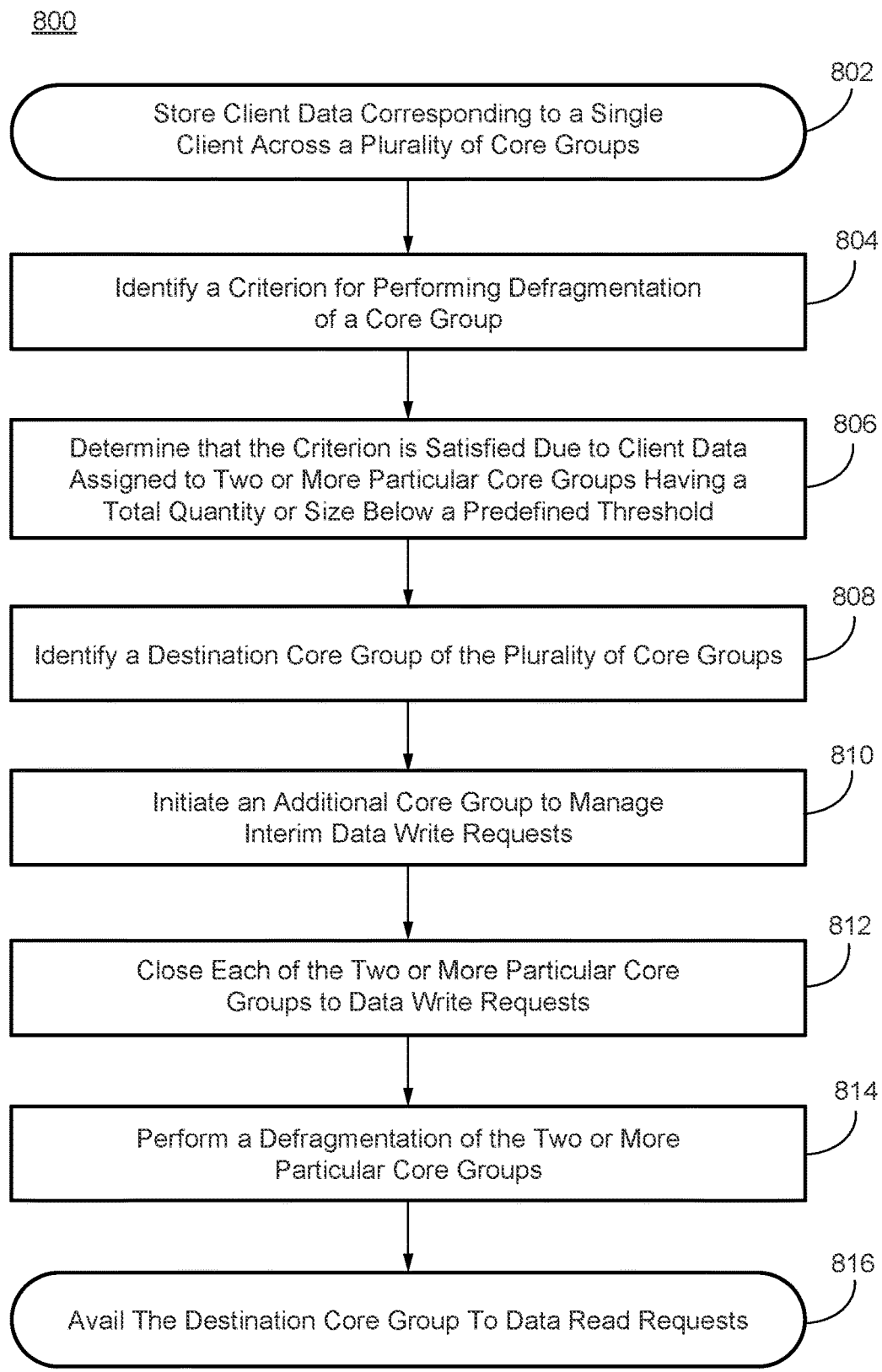
FIG. 8 depicts a flow diagram illustrating an example process for performing a storage of client data in core groups and defragmentation of particular core groups in accordance with embodiments.

FIG. 8 depicts a flow diagram illustrating an example process for performing a storage of client data in core groups and defragmentation of particular core groups in accordance with embodiments. The process 800 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 800 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 800 of FIG. 8 may be performed by one or more elements of the cloud platform 110 shown in FIG. 1. For example, the process 800 may be performed by a group coordinator as described with respect to FIG. 1. The code may be stored on a computer-readable storage medium, for example, in the form of a computer program including a plurality of instructions executable by one or more processors. The computer readable storage medium may be non-transitory.

Process 800 begins at 802 when client data corresponding to a single client is stored across a plurality of core groups. Each core group out of the plurality of core groups can be assigned to a single client, which ensures other clients cannot access the core group. Client data can be ingested, analyzed or queried within core groups. Each core group can be confined to a specific hardware resource. By confining core groups to specific hardware resources, client queries of client data can be performed more efficiently. Each core group can have an initial timestamp and a later timestamp associated with the core group. The timestamps can be predefined by the client. For example, the timestamps can represent the beginning and end of a fiscal quarter. The timestamps do not need to relate to present time. For example, the client can decide to store historical data in the core groups.

At 804, the process includes identifying a condition for performing defragmentation of a core group. In some examples, the condition can include a condition that a quantity or size of data in the core group is below a predefined threshold amount. The quantity or size of data in the core group can be reduced when clients delete data from a core group. If the quantity or size of data in the core group falls below the predefined threshold amount, the core group can be identified as fragmented. In other examples, the condition can have other parameters. For example, the condition can be met when a core group is read only. In this example, if a core group is identified as read only, the core group can be a candidate for defragmentation. In some examples, a condition for defragmentation can be met based on a result of a simulation. For example, the simulation can project a size of data (e.g., generally or corresponding to a given client) that would be stored on each of one or more cores (e.g., a destination core) after a simulated defragmentation.

At 806, the process includes determining that the condition is satisfied due to client data assigned to two or more particular core groups having a total quantity or size below a predetermined threshold. For example, the predetermine threshold can be less than ten percent of a memory storage capacity allotted to the core group. In the example, the condition is satisfied when two or more particular core groups each contain client data at less than ten percent capacity. The particular core groups are determined to be candidates for merging during a defragmentation process.

At 808, the process includes identifying a destination core group of the plurality of core groups. In some examples, the destination core group can be an empty core group such that the destination core group does not contain any client data prior to the defragmentation process. In other examples, the destination core group can be identified from among the particular core groups, which are candidates for the defragmentation process. During defragmentation, the particular core groups can merge into the destination core group. During defragmentation, the destination core group can be hidden, meaning that the destination core group is closed to both read and write processes.

At 810, the process includes initiating at least one additional core group to manage interim data write requests. During defragmentation, the particular core groups can be read only. Thus, the at least one additional core group can help ensure that clients have access to data storage, analysis, and query during defragmentation. In, some examples, the at least one additional core group can include an adjacent core group. An adjacent core group is a core group that includes at least one timestamp that is adjacent to the timestamp of at least one of the particular core groups that have been determined to satisfy the condition.

At 812, the process includes closing each of the two or more particular core groups to data write requests. The two or more particular core groups can not receive client data for storage during the defragmentation process. During defragmentation, data write requests can be handled by the at least one additional core group. The two or more particular core groups are read only, which means that client data in the two or more particular core groups are still open for client queries during defragmentation.

At 814, the process includes performing a defragmentation of the two or more particular core groups. In some examples, performing the defragmentation occurs periodically, such as every 24 hours. In other examples, the defragmentation can be performed after a trigger occurs. The trigger can include identifying a minimum number of the at least one of the particular core groups. For example, the defragmentation process may not occur until at least 4 particular core groups have been identified as candidates for defragmentation.

During defragmentation, the two or more particular core groups can merge into the destination core group. Once merged, the two or more particular core groups can be reallocated for future use. The reallocated core groups can serve the same client or a different client.

At 816, the process includes availing the destination core group to data read requests after the defragmentation process is complete. The destination core group is read only, meaning new client data cannot be stored in the destination core group unless the destination core group later becomes a candidate for defragmentation and becomes reallocated. Clients can still delete data stored in the destination core group, which means this read only core group can later become a candidate for defragmentation. After defragmentation, there is some overlap between the destination core group and at least one of the additional core groups. Thus, data queries that include data in the destination core group will often also include at least one of the additional core groups.

Figure 9:
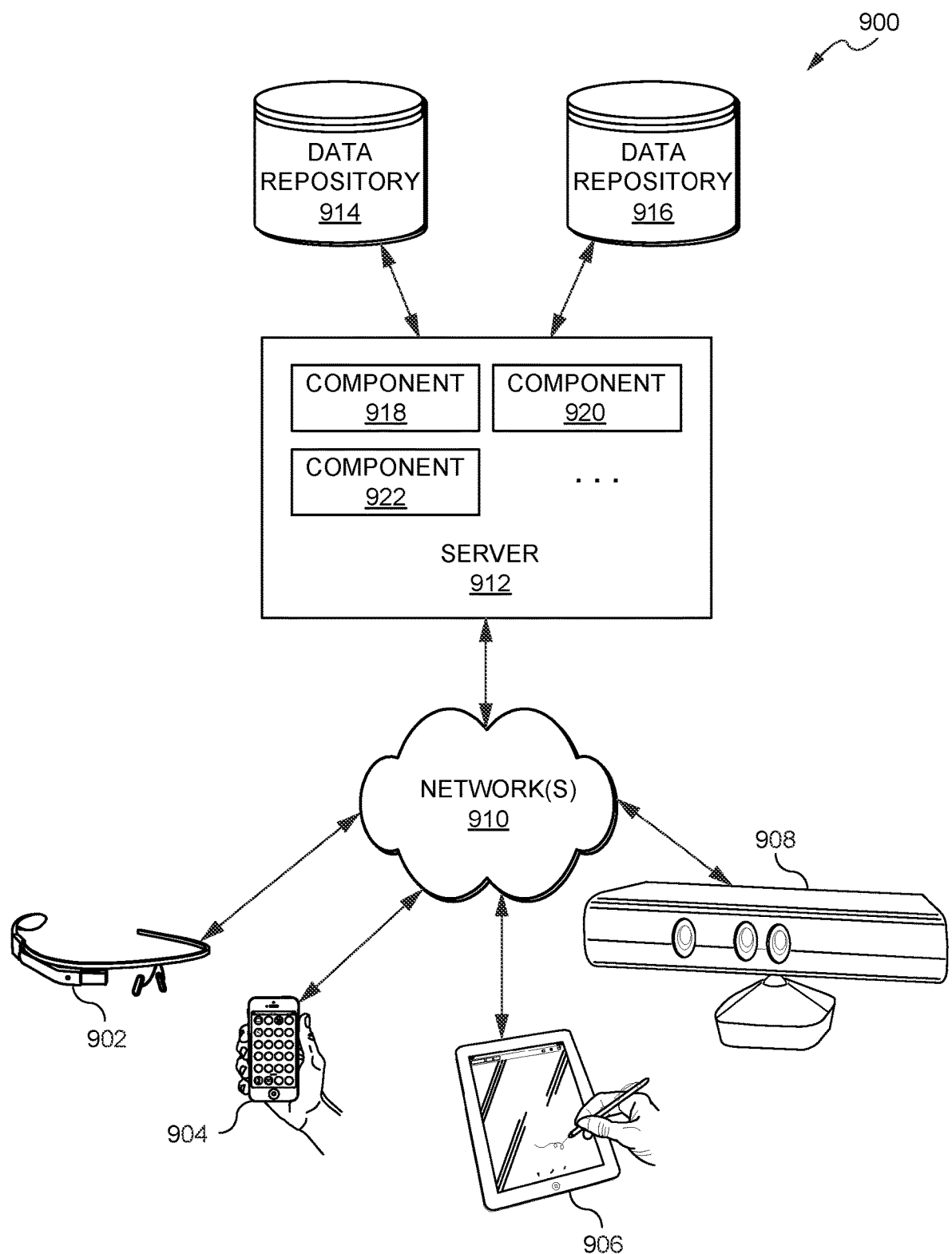
FIG. 9 depicts a simplified diagram of a distributed system 900 for implementing an embodiment.

FIG. 9 depicts a simplified diagram of a distributed system 900 for implementing an embodiment. In the illustrated embodiment, distributed system 900 includes one or more client computing devices 902, 904, 906, and 908, coupled to a server 912 via one or more communication networks 910. Client computing devices 902, 904, 906, and 908 may be configured to execute one or more applications.

In various embodiments, server 912 may be adapted to run one or more services or software applications that enable the processing described in this disclosure.

In certain embodiments, server 912 may also provide other services or software applications that can include non-virtual and virtual environments. In some embodiments, these services may be offered as web-based or cloud services, such as under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in FIG. 9, server 912 may include one or more components 918, 920, and 922 that implement the functions performed by server 912. These components may include software components that may be executed by one or more processors, hardware components, or combinations thereof. It should be appreciated that various different system configurations are possible, which may be different than the distributed system 900. The embodiment shown in FIG. 9 is thus one example of a distributed system for implementing an embodiment system and is not intended to be limiting.

Users may use client computing devices 902, 904, 906, and/or 908 to interact with server 912 in accordance with the teachings of this disclosure. A client device may provide an interface that enables the user of the client device to interact with the client device. The client device may also output information to the user via the interface. Although FIG. 9 depicts only four client computing devices, any number of client computing devices may be supported.

The computing devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony Playstation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 910 may be any type of network familiar to those skilled in the art that can support data communications using any of a variety of available protocols, including without limitation TCP/IP (transmission control protocol/Internet protocol), SNA (systems network architecture), IPX (Internet package exchange). AppleTalk®, and the like. Merely by way of example, network(s) 910 can be a local area network (LAN), networks based on Ethernet, Token-Ring, a wide area network (Wan), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 912 may be composed of one or more general purpose computers, specialized server computers (including, by way of example, PC (personal computer) servers, UNIX® servers, mid-range servers, mainframe computers, rack-mounter servers, etc.), server farms, server clusters, or any other appropriate arrangement and/or combination. Server 912 can include one or more virtual machines running virtual operating systems, or other computing architectures involving virtualization such as one or more flexible pools of logical storage devices that can be virtualized to maintain virtual storage devices for the server. In various embodiments, server 912 may be adapted to run one or more services or software applications that provide the functionality described in the foregoing disclosure.

The computing systems in server 912 may run one or more operating systems including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 912 may include one or more applications to analyze and consolidate data feeds and/or event updates received from the users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more data repositories 914, 916. These data repositories may be used to store data and other information in certain embodiments. For example, one or more of the data repositories 914, 916 may be used to store data or information generated by the processing described herein and/or data or information used for the processing described herein. Data repositories 914, 916 may reside in a variety of locations. For example, a data repository used by server 912 may be local to server 912 or may be remote from server 912 and in communication with server 912 via a network-based or dedicated connection. Data repositories 914, 916 may be of different types. In certain embodiments, a data repository used by server 912 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of the data repositories 914, 916 may also be used by applications to store application data. The data repositories used by applications may be of different types.

Figure 10:
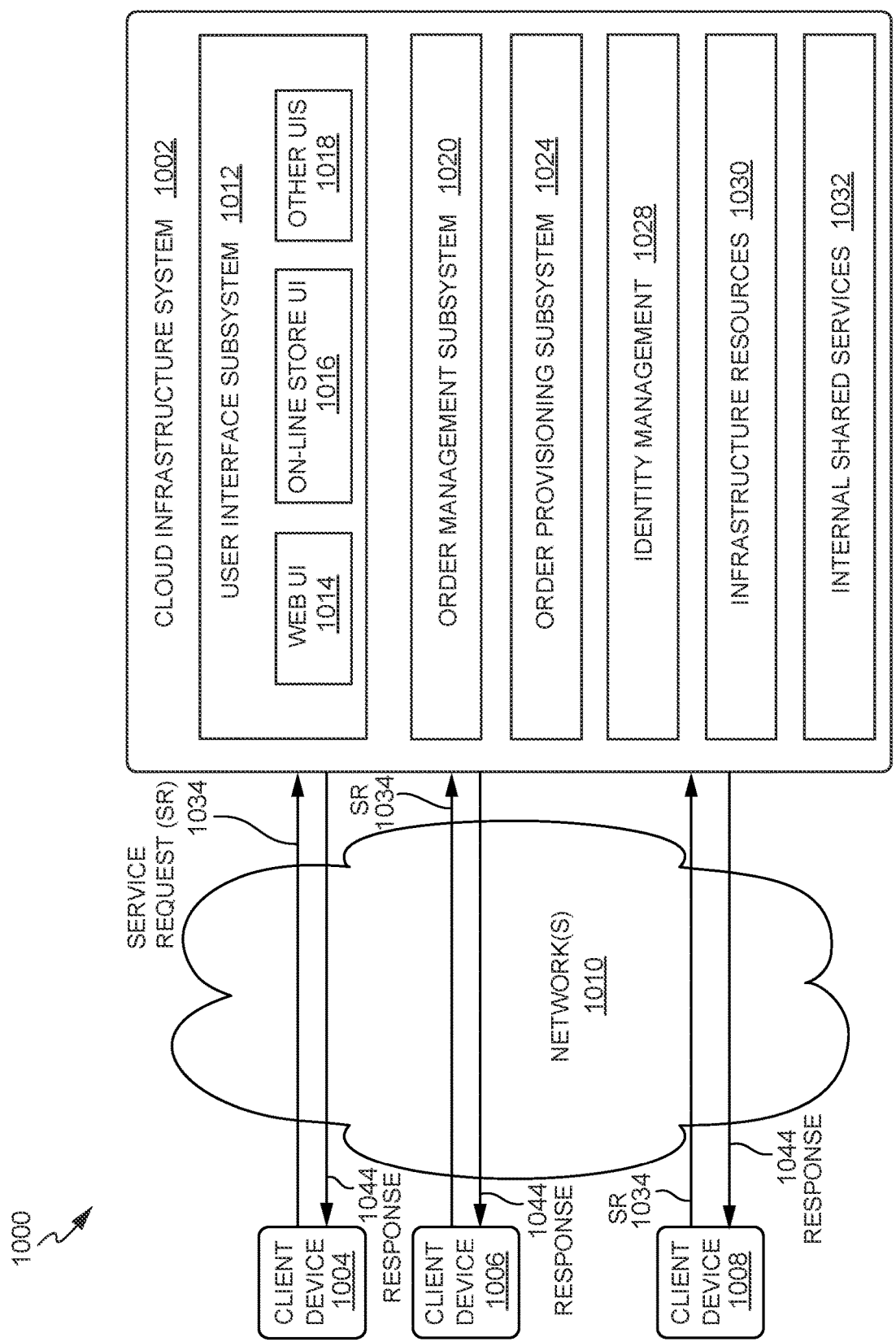
FIG. 10 is a simplified block diagram of a cloud-based system environment in which functionalities described herein may be offered as cloud services, in accordance with certain embodiments.

In certain embodiments, the functionalities described in this disclosure may be offered as services via a cloud environment. FIG. 10 is a simplified block diagram of a cloud-based system environment in which functionalities described herein may be offered as cloud services, in accordance with certain embodiments. In the embodiment depicted in FIG. 10, cloud infrastructure system 1002 may provide one or more cloud services that may be requested by users using one or more client computing devices 1004, 1006, and 1008. Cloud infrastructure system 1002 may comprise one or more computers and/or servers that may include those described above for server 912. The computers in cloud infrastructure system 1002 may be organized as general purpose computers, specialized server computers, server farms, server clusters, or any other appropriate arrangement and/or combination.

Network(s) 1010 may facilitate communication and exchange of data between clients 1004, 1006, and 1008 and cloud infrastructure system 802. Network(s) 1010 may include one or more networks. The networks may be of the same or different types. Network(s) 1010 may support one or more communication protocols, including wired and/or wireless protocols, for facilitating the communications.

The embodiment depicted in FIG. 10 is only one example of a cloud infrastructure system and is not intended to be limiting. It should be appreciated that, in some embodiments, cloud infrastructure system 1002 may have more or fewer components than those depicted in FIG. 10, may combine two or more components, or may have a different configuration or arrangement of components. For example, although FIG. 10 depicts three client computing devices, any number of client computing devices may be supported in alternative embodiments.

The term cloud service is generally used to refer to a service that is made available to users on demand and via a communication network such as the Internet by systems (e.g., cloud infrastructure system 1002) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain embodiments, cloud infrastructure system 1002 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1002 may include a suite of applications, middleware, databases and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1002. Examples of SaaS services provided by Oracle Corporation® include, without limitation, various services for human resources/capital management, customer relationship management (CRM), enterprise resource planning (ERP), supply chain management (SCM), enterprise performing management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1002. Cloud infrastructure system 1002 then performs processing to provide the services requested in the customer's subscription order. Cloud infrastructure system 1002 may be configured to provide one or even multiple cloud services.

Cloud infrastructure system 1002 may provide the cloud services via different deployment models. In a public cloud model, cloud infrastructure system 1002 may be owned by a third-party cloud services provider and the cloud services are offered to any general public customer, where the customer can be an individual or an enterprise. In certain other embodiments, under a private cloud model, cloud infrastructure system 1002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1002 and the services provided may be shared by several organizations in a related community. Various other models such as hybrids of the above mentioned models may also be used.

Client computing devices 1004, 1006, and 1008 may be of different types (such as devices 902, 904, 906, and 908 depicted in FIG. 9) and may be capable of operating one or more client applications. A user may use a client device to interact with cloud infrastructure system 1002, such as to request a service provided by cloud infrastructure system 1002. For example, a user may use a client device to request data storage services described in this disclosure.

In some embodiments, the processing performed by cloud infrastructure system 1002 may include big data analysis. The analysis may include using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 10, cloud infrastructure system 1002 may include infrastructure resources 1030 that are utilized for facilitating the provision of various cloud services offered by cloud infrastructure system 1002.

Infrastructure resources 1030 may include, for example, processing resources, storage or memory resources, networking resources, and the like.

In certain embodiments, to facilitate efficient provisioning of these resources for supporting the various cloud services provided by cloud infrastructure system 1002 for different customers, the resources may be bundled into sets of resources or resource modules (also referred to as "pods"). Each resource module or pod may comprise a pre-integrated and optimized combination of resources of one or more types. In certain embodiments, different pods may be provisioned for a databased service, a second set of pods, which may include a different combination of resources than a pod in the first set of pods, may be provisioned for Java service, and the like. For some services, the resources allocated for provisioning the services may be shared between the services.

Cloud infrastructure system 1002 may itself internally use services 1032 that are shared by different components of cloud infrastructure system 1002 and which facilitate the provisioning of services by cloud infrastructure system 1002. These internal shared services may include, without limitation, a security and identity service, an integration service, an enterprise repository service, an enterprise manager service, a virus scanning and white-list service, a high availability, backup and recovery service, service for enabling cloud support, an email service, a notification service, a file transfer service, and the like.

Cloud infrastructure system 1002 may comprise multiple subsystems. These subsystems may be implemented in software, or hardware, or combinations thereof. As depicted in FIG. 10, the subsystems may include a user interface subsystem 1012 that enables users or customers of cloud infrastructure system 1002 to interact with cloud infrastructure system 1002. User interface subsystem 1012 may include various different interfaces such as a web interface 1014, an online store interface 1016 where cloud services provided by cloud infrastructure system 1002 are advertised and are purchasable by a customer, and other interfaces 1018. For example, a customer may access the online store, browse cloud services offered by cloud infrastructure system 1002, and place a subscription order for one or more services offered by cloud infrastructure system 1002 that the customer wishes to subscribe to. The service request may include information identifying the customer and one or more services that the customer desires to subscribe to.

In certain embodiments, such as the embodiment depicted in FIG. 10, cloud infrastructure system 1002 may comprise an order management subsystem (OMS) 1020 that is configured to process the new order. As part of the processing, OMS 1020 may be configured to create an account for the customer, if not done already, receive billing and/or accounting information from the customer that is to be used for billing the customer for providing the requested service to the customer, verify the customer information, upon verification, book the order for the customer, and orchestrate various workflows to prepare the order for provisioning.

Once properly validated OMS 1020 may then invoke the order provisioning subsystem (OPS) 1024 that is configured to provision resources for the order including processing, memory, and networking resources. The provisioning may include allocating resources for the order and configuring the resources to facilitate the services requested by the customer order. The manner in which resources are provisioned for an order and the type of provision resources may depend on the type of cloud service that has been ordered by the customer. For example, according to one workflow, OPS 1024 may be configured to determine the particular cloud service being requested and identify a number of pods that may have been pre-configured for that particular cloud service. The number of pods that are allocated for an order may depend on the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1002 may send a response or notification 1044 to the requesting customer to indicate when the requested service is now ready for use. In some instances, information (e.g., a link) may be sent to the customer that enables the customer to start using and availing the benefits of the requested services.

Cloud infrastructure system 1002 may provide services to multiple customers. For each customer, cloud infrastructure system 1002 is responsible for managing information related to one or more subscription orders received from the customer, maintaining customer data related to the orders, and providing the requested services to the customer. Cloud infrastructure system 1002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1002 may provide services to multiple customers in parallel. Cloud infrastructure system 1002 may store information for these customers, including possibly proprietary information. In certain embodiments, cloud infrastructure system 1002 comprises an identity management subsystem (IMS) 1028 that is configured to manage customers information and provide the separation of the managed information such that information related to one customer is not accessible by another customer. IMS 1028 may be configured to provide various security-related services such as identity services, such as information access management, authentication and authorization services, services for managing customer identities and roles and related capabilities, and the like.

Figure 11:
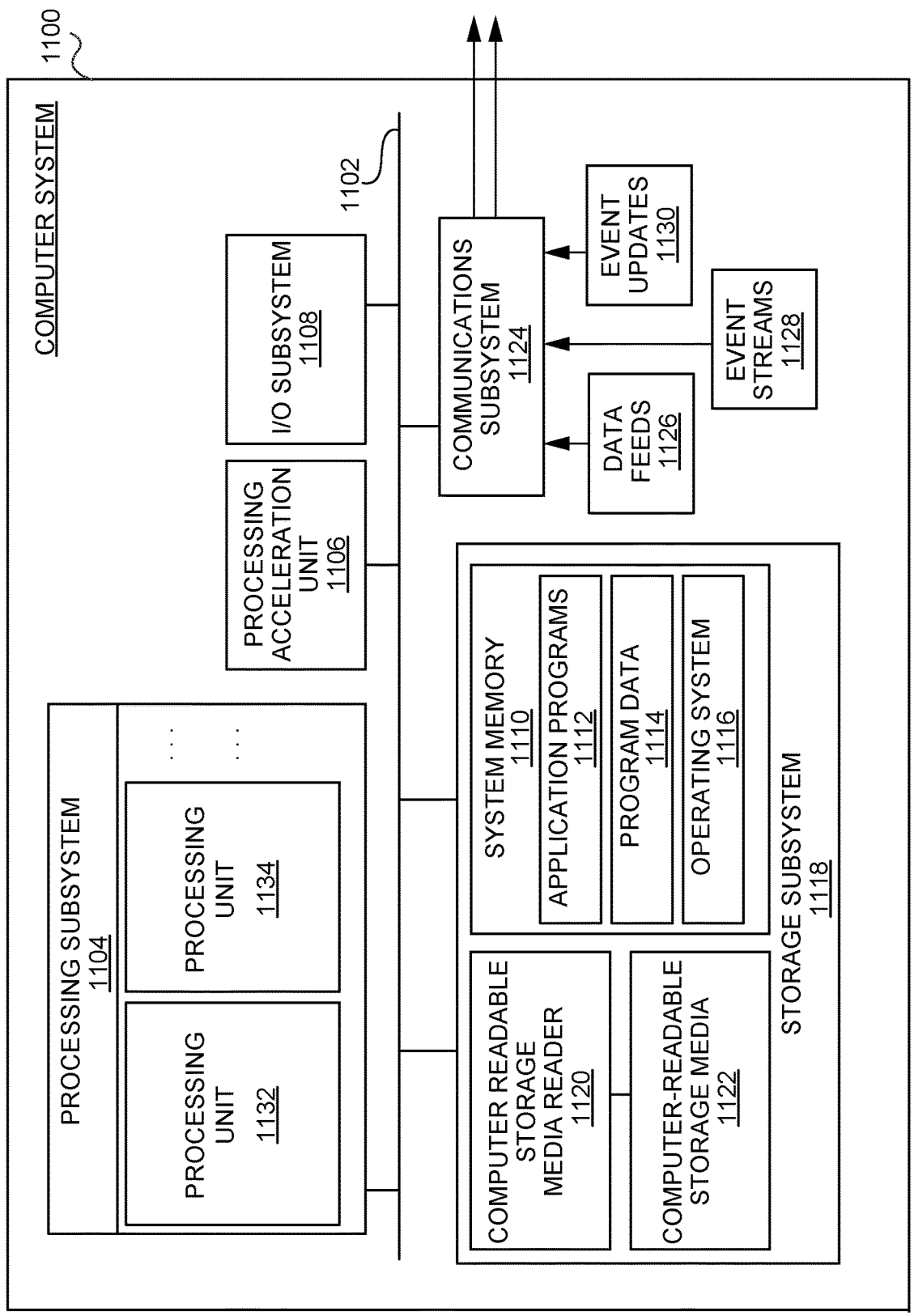
FIG. 11 illustrates an exemplary computer system 1100 that may be used to implement certain embodiments.

FIG. 11 illustrates an exemplary computer system 1100 that may be used to implement certain embodiments. For example, in some embodiments, computer system 1100 may be used to implement any of various servers and computer systems described above. As shown in FIG. 11, computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118, and a communication subsystem 1124. Storage subsystem 1118 may include non-transitory computer-readable storage media including storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processors, application specific integrated circuits (ASICs), or field programmable gate arrays (FPGAs). The processors may be single core or multicore processors. The processing resources of computer system 1100 can be organized into one or more processing units 1132, 1134, etc. A processing unit may include one or more processors, one or more cores from the same or different processors, a combination of cores and processors, or other combinations of cores and processors. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as ASICs or FPGAs.

In some embodiments, the processing units in processing subsystem 1104 can execute instructions stored in system memory 1110 or on computer-readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above. In instances where computer system 1100 is executing one or more virtual machines, one or more processing units may be allocated to each virtual machine.

In certain embodiments, a processing acceleration unit 1106 may optionally be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term input device is intended to include all possible types of devices and mechanisms for inputting information to computer system 1100. User interface input devices may include, for example, a keyboard, pointing devices such as a mouse or trackball, a touchpad or touchscreen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., blinking while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/visual information such as monitors, printers, speakers, headphones, automotive navigation systems, plotters, voice output devices, and modems.

Storage subsystem 1118 provides a repository or data store for storing information and data that is used by computer system 1100. Storage subsystem 1118 provides a tangible non-transitory computer-readable storage medium for storing the basic programming and data constructs that provide the functionality of some embodiments. Storage subsystem 1118 may store software (e.g., programs, code modules, instructions) that when executed by processing subsystem 1104 provides the functionality described above. The software may be executed by one or more processing units of processing subsystem 1104. Storage subsystem 1118 may also provide a repository for storing data used in accordance with the teachings of this disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM), dynamic random access memory (DRAM), and the like.

By way of example, and not limitation, as depicted in FIG. 11, system memory 1110 may load application programs 1112 that are being executed, which may include various applications such as Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially available UNIX® or UNIX-like operating systems (including, without limitation, the variety of GNU/Linux operating systems, the Google Chrome® OS, and the like) and/or mobile operating systems such as iOS, Windows® Phone, Android® OS, Palm® OS operating systems, and others.

Computer-readable storage media 1122 may store programming and data constructs that provide the functionality of some embodiments. Computer-readable storage 1122 may provide storage of computer-readable instructions, data structures, program modules, and other data for computer system 1100. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to Zip® drives, flash memory cards, universal serial bus (USB) flash drives, secure digital (SD) cards, DVD disks, digital video tape, and the like. Computer-readable storage media 1122 may also include solid-state devices (SSD) based on non-volatile memory such as flash memory SSDs, enterprise flash drives, solid state ROM, and the like, SSDs based on volatile memories such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1118 may also include a computer-readable storage media reader 1120 that can further be connected to computer-readable storage media 1122. Reader 1120 may receive and be configured to read memory from a memory device such as a disk, a flash drive, etc.

In certain embodiments, computer system 1100 may support virtualization technologies, including but not limited to virtualization of processing and memory resources. For example, computer system 1100 may provide support for executing one or more virtual machines. In certain embodiments, computer system 1100 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1100. Accordingly, multiple operating systems may potentially be run concurrently by computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G, or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 1124 can provide wired network connectivity (e.g., Ethernet) in addition to or instead of a wireless interface.

Communication subsystem 1124 can receive and transmit data in various forms. For example, in some embodiments, in addition to other forms, communication subsystem 1124 may receive input communications in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to communicate data from computer system 1100 to other computer systems or networks. The data may be communicated in various different forms such as structured and/or unstructured data feeds 1126, event streams 1128, event updates 1130, and the like to one or more databases that may be in communication with one or more streaming data sources computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1100 depicted in FIG. 11 is intended only as a specific example. Many other configurations having more or fewer components than the system depicted in FIG. 11 are possible.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on non-transitory memory medium, or any combination thereof. Processes can communicate using a variety of techniques including but not limited to conventional techniques for inter-process communications, and different parts of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments provides an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus although specific embodiments have been described, these are not intended to be limiting. Various modifications and equivalents are within the scope of the following claims.

What is claimed is:

1. A computer-implemented method comprising:
    storing client data corresponding to a single client across a plurality of core groups, wherein each of the plurality of core groups includes one or more cores associated with a group coordinator to manage cores in the core group;
    in a particular iteration of a plurality of iterations of defragmentation consideration, determining to proceed with a defragmentation of two or more particular core groups in the plurality of core groups;
    identifying a destination core group of the plurality of core groups to receive client data from each other of the two or more particular core groups;
    initiating at least one additional core group to manage interim data write requests from the single client during a merge of the two or more particular core groups;
    closing each of the two or more particular core groups to data write requests;
    performing a defragmentation of the two or more particular core groups by merging the two or more particular core groups into the destination core group, wherein the at least one additional core group includes data from write requests that prior to defragmentation would have been written to the two or more particular core groups; and
    availing the destination core group to data read requests, wherein subsequent to defragmentation, the destination core group receives read requests for data that would have been received by one of the two or more particular core groups prior to defragmentation.

2. The computer-implemented method of claim 1, wherein for the particular iteration, determining to proceed with defragmentation occurs in response to determining that a total quantity or size of data in the two or more particular core groups is below a predetermined threshold.

3. The computer-implemented method of claim 1, wherein for the particular iteration, the determination to proceed with defragmentation is based on a result of a simulation.

4. The computer-implemented method of claim 1, wherein, for the particular iteration, the determination to proceed with defragmentation is based on a condition being satisfied for the two or more particular core groups that was not satisfied for the two or more particular core groups in a previous iteration.

5. The computer-implemented method of claim 1, wherein a timestamp of each core group in the plurality of core groups represents an initial time at which at least some data corresponding to the single client and that was written to the core group was received, the computer-implemented method further comprising selecting an earliest timestamp from among those corresponding to the two or more particular core groups and wherein initiating the at least one additional core group comprises adjusting the timestamp of the at least one additional core group to match the earliest timestamp.

6. The computer-implemented method of claim 1, further comprising:
    receiving a data write request from the single client during defragmentation; and
    writing data identified in the data write request to storage allocated to the at least one additional core group.

7. The computer-implemented method of claim 1, wherein determining to proceed is based on determining that a predetermined threshold amount of read-only core groups are present or that a time since each of the two or more particular core groups was initiated exceeds a predetermined threshold.

8. A system comprising:
    one or more data processors; and
    a non-transitory computer-readable storage medium containing instructions which, when executed on the one or more data processors, cause the one or more data processors to perform operations comprising:
        storing client data corresponding to a single client across a plurality of groups, wherein each of the plurality of core groups includes one or more cores associated with a group coordinator to manage cores in the core group;
        in a particular iteration of a plurality of iterations of defragmentation consideration, determining to proceed with a defragmentation of two or more particular core groups in the plurality of core groups;

identifying a destination core group of the plurality of core groups to receive client data from each other of the two or more particular core groups;

initiating at least one additional core group to manage interim data write requests from the single client during a merge of the two or more particular core groups;

closing each of the two or more particular core groups to data write requests;

performing a defragmentation of the two or more particular core groups by merging the two or more particular core groups into the destination core group, wherein the at least one additional core group includes data from write requests that prior to defragmentation would have been written to the two or more particular core groups; and availing the destination core group to data read requests, wherein subsequent to defragmentation, the destination core group receives read requests for data that would have been received by one of the two or more particular core groups prior to defragmentation.

9. The system of claim 8, wherein for the particular iteration, determining to proceed with defragmentation occurs in response to determining that a total quantity or size of data in the two or more particular core groups is below a predetermined threshold.

10. The system of claim 8, wherein for the particular iteration, the determination to proceed with defragmentation is based on a result of a simulation.

11. The system of claim 8, wherein, for the particular iteration, the determination to proceed with defragmentation is based on a condition being satisfied for the two or more particular core groups that was not satisfied for the two or more particular core groups in a previous iteration.

12. The system of claim 8, wherein a timestamp of each core group in the plurality of core groups represents an initial time at which at least some data corresponding to the single client and that was written to the core group was received, the computer-implemented method further comprising selecting an earliest timestamp from among those corresponding to the two or more particular core groups and wherein initiating the at least one additional core group comprises adjusting the timestamp of the at least one additional core group to match the earliest timestamp.

13. The system of claim 8, the operations further comprising:

receiving a data write request from the single client during defragmentation; and writing data identified in the data write request to storage allocated to the at least one additional core group.

14. The system of claim 8, wherein determining to proceed is based on determining that a predetermined threshold amount of read-only core groups are present or that a time since each of the two or more particular core groups was initiated exceeds a predetermined threshold.

15. A computer program product tangibly embodied in a non-transitory computer-readable storage medium, including instructions configured to cause one or more data processors to perform operations comprising:

storing client data corresponding to a single client across a plurality of core groups, wherein each of the plurality of core groups includes one or more cores associated with a group coordinator to manage cores in the core group;

in a particular iteration of a plurality of iterations of defragmentation consideration, determining to proceed with a defragmentation of two or more particular core groups in the plurality of core groups;

identifying a destination core group of the plurality of core groups to receive client data from each other of the two or more particular core groups;

initiating at least one additional core group to manage interim data write requests from the single client during a merge of the two or more particular core groups;

closing each of the two or more particular core groups to data write requests;

performing a defragmentation of the two or more particular core groups by merging the two or more particular core groups into the destination core group, wherein the at least one additional core group includes data from write requests that prior to defragmentation would have been written to the two or more particular core groups; and availing the destination core group to data read requests, wherein subsequent to defragmentation, the destination core group receives read requests for data that would have been received by one of the two or more particular core groups prior to defragmentation.

16. The computer program product of claim 15, wherein for the particular iteration, determining to proceed with defragmentation occurs in response to determining that a total quantity or size of data in the two or more particular core groups is below a predetermined threshold.

17. The computer program product of claim 15, wherein for the particular iteration, the determination to proceed with defragmentation is based on a result of a simulation.

18. The computer program product of claim 15, wherein, for the particular iteration, the determination to proceed with defragmentation is based on a condition being satisfied for the two or more particular core groups that was not satisfied for the two or more particular core groups in a previous iteration.

19. The computer program product of claim 15, wherein a timestamp of each core group in the plurality of core groups represents an initial time at which at least some data corresponding to the single client and that was written to the core group was received, the computer-implemented method further comprising selecting an earliest timestamp from among those corresponding to the two or more particular core groups and wherein initiating the at least one additional core group comprises adjusting the timestamp of the at least one additional core group to match the earliest timestamp.

20. The computer program product of claim 15, the operations further comprising:

receiving a data write request from the single client during defragmentation; and writing data identified in the data write request to storage allocated to the at least one additional core group.

* * * * *